Figure 1:
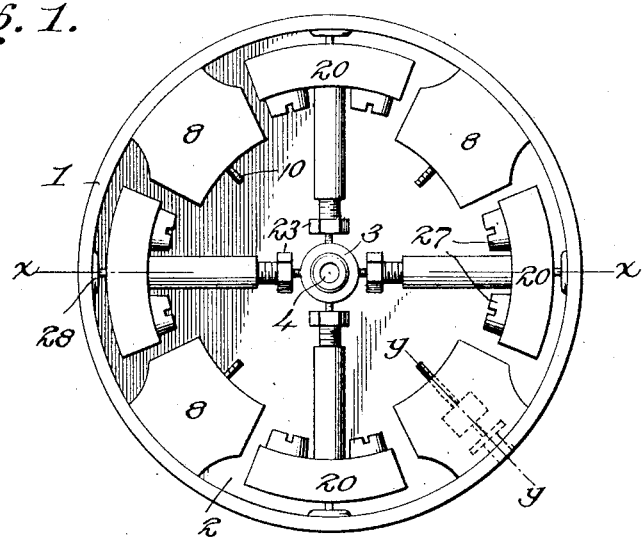

I. POVELSEN.
COMPENSATING BALANCE WHEEL.
APPLICATION FILED MAR. 2, 1920.

1,350,035.

Patented Aug. 17, 1920.

Inventor
Ingild Povelsen,
By J.W. Milburn
Attorney

UNITED STATES PATENT OFFICE.

INGILD POVELSEN, OF WASHINGTON, DISTRICT OF COLUMBIA.

COMPENSATING BALANCE-WHEEL.

1,350,035.        Specification of Letters Patent.        Patented Aug. 17, 1920.

Application filed March 2, 1920. Serial No. 362,877.

*To all whom it may concern:*

Be it known that I, INGILD POVELSEN, a citizen of the United States, residing at Washington, in the District of Columbia, have invented a new and useful Compensating Balance-Wheel, of which the following is a specification.

My invention relates to balance wheels for watches, clocks and chronometers, and is especially useful in connection with marine chronometers and finely adjusted watches.

One of the objects of my invention is to provide a balance wheel which is non-magnetic and which will retain its shape and adjustment through repeated or extreme changes in temperature.

Another object of the invention is to provide a balance wheel which will have a minimum amount of air resistance in its oscillations and will be unaffected by barometric changes.

A further object is the provision of a compensating balance wheel having timing and temperature adjustments lying within, but operable from the outside of the wheel rim. This is for the purpose of permitting the adjustments to be effected without the usual distortion of the balance wheel which is experienced in the balance wheels heretofore used. Placing the adjustments within the rim serves to decrease air resistance.

One of the forms of balance wheels heretofore used has been constructed with a continuous rim connected with the wheel hub by spaced arms. Another consists of two curved arms projecting from the hub to form an approximate circle open at two points, each of the arms being formed of two metals of different coefficients of expansion welded together. The first of these forms is usually provided with metal protuberances on its periphery which act as compensating balance weights. These protuberances have the effect of increasing the air resistance to the oscillations of the balance wheel. Moreover, the method of adjusting the compensation means of such wheels is such as to make the wheel liable to become distorted through such adjustment.

In the second form of balance wheel above-mentioned, the two metals, although welded together, are put under great stress by their unequal expansion under the influence of temperature changes, the metals tending to separate and cause a distortion of the wheel.

Many of the balance wheels now in use are made of steel, and are consequently subject to magnetization, to the great detriment of the wheel and the accuracy of the entire instrument of which it forms a part. This is especially objectionable in marine chronometers, where the instrument is commonly surrounded by enormous bodies of iron and steel, and in watches used in the vicinity of electrical machines.

To obviate these various objections and increase the accuracy of adjustment, thus insuring perfect compensation under all conditions and changes of temperature, I construct my balance wheel of a solid disk formed integrally with the rim and hub; so position the timing and compensating devices that they are entirely within the rim, leaving the outer surface of the rim smooth; and provide means for making all adjustments from without the rim, thus avoiding the distortion of the rim and the destruction of the compensation relation.

My balance wheel is constructed, in its preferred form of non-magnetic metals, such as, for example, platinum, silver and gold, in order that it may retain its exact adjustment and perfect compensation in the presence of magnetic fields or influences.

To attain the above-mentioned objects I have devised the improved compensating balance wheel shown in the accompanying drawings, wherein:—

Figure 2:
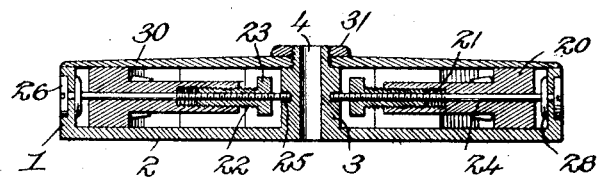
Figure 3:
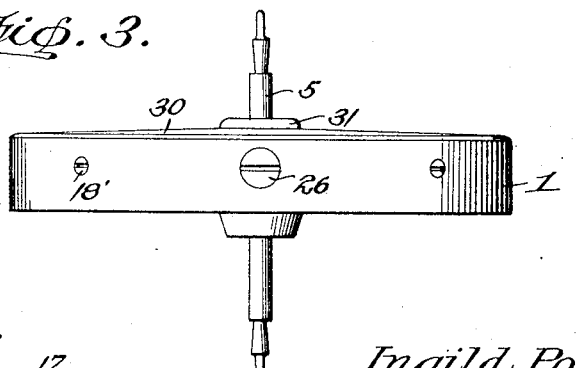
Figure 4:
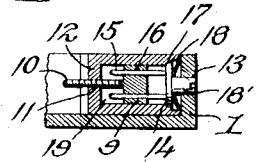

Figure 1 is a plan view of the balance wheel with its cover removed, parts being shown in dotted lines for better illustration, Fig. 2 is a sectional view taken on line $x$—$x$ of Fig. 1, Fig. 3 is a side elevational view of the wheel mounted on the balance shaft, and Fig. 4 is a sectional detail view taken on line $y$—$y$ of Fig. 1.

In its preferred embodiment my invention consists of a balance wheel having a solid continuous rim 1, rigidly attached by a solid disk 2 to the wheel hub 3 through which there is the usual opening 4 to receive the balance shaft 5 upon which the balance wheel is mounted. The disk, rim and hub are preferably made integral and of the same material throughout, preferably platinum. The integral construction is employed to reduce the number of separate parts and minimize the opportunity for distortion. The selection of platinum as the material best suited for the construction of these parts is made because of its weight and small degree of susceptibility to temperature changes. It is to be understood, however, that the rim and hub may be of separate pieces of metal rigidly fastened to the disk, and that other suitable metals possessing a relatively high specific gravity and a relatively low coefficient of expansion may be used.

The balance wheel is provided with a cover 30 fitting closely upon the rim and of the same diameter as the rim, so that the entire outer surface of the wheel is smooth and devoid of protuberances liable to increase the air resistance to the oscillation of the wheel. The cover is fastened to the wheel by a nut 31, screwed on the upper screw-threaded portion of the hub, which projects through a central opening in the cover for this purpose.

The adjustable parts of the wheel are positioned entirely within the rim and consist of timing balance weights and compensating balance weights alternately placed around the inner periphery of the rim. The timing weights are adjusted to regulate the movement of the balance wheel irrespective of the temperature conditions, while the adjustment of the compensating weights is designed to afford the necessary regulation to offset any distortion due to temperature changes. The latter adjustment is largely automatic and ordinarily requires little or no manipulation, although means are provided for performing manual adjustments to set the parts in the relation best suited to certain ranges of temperature and to render possible a final minute adjustment where the precise degree of exactness in compensation has not been attained by the device.

The timing adjustment means comprises a hollow casing 8, preferably of the same metal or alloy as the disk 2, the chamber 19 of the casing being shaped to snugly receive a cylindrical weight 9 and permit its rotative and longitudinal movement therein. The weight 9 is preferably of gold, but may be of any other metal or alloy having approximately twice the coefficient of expansion as the metal of which the disk 2 is constructed. Fixed to the inner side of weight 9 is a screw 10 projecting through a screw-threaded opening 11 in the inner wall 12 of the casing. The timing adjustment is effected by slightly changing the position of the weight 9 within the chamber 19, this adjustment serving to move the weight inwardly or outwardly with respect to the circular line of gravity of the balance wheel. The weight 9 may have a slot in its outer surface to receive a screw-driver or other instrument which may be inserted through an opening 13 provided in the rim 1 to enable the adjustment of this weight to be made. In the preferred form of my invention, however, I employ, as the means for turning the weight 9 and its guide screw 10, a disk 14 provided with a pair of spaced prongs 15, 15, to project through similarly spaced slots 16, 16 through the weight 9. Disk 14 is held tightly on its seat 17 by a spring 18 and has a projecting head 18¹ fitting snugly in the opening 13 with its outer face flush with the surface of the rim, the head being slotted to receive a screw driver or other suitable adjusting instrument.

The compensating adjustment is effected through the opposite movement, during temperature changes, of the component parts of a plurality of compensating devices arranged radially about the hub 3 and composed of two or more metals or alloys having different coefficients of expansion. The specific means employed consists of a plurality of weights, each composed of a segmental portion 20 and an integral tubular portion 21 projecting from the inner side of the segmental portion toward the hub. The tubular portion 21 has its end portion screw-threaded internally to receive the shank of a screw 22, which has a head 23 by means of which it may be given a relatively small radial movement for final adjustment of the wheel.

Each compensating weight is slidably positioned on a rod 24 which passes through the rim 1, weight portions 20, 21 and screw 22 and is rotatably seated in a socket 25 in the side of the hub 3. Rod 24 is screw-threaded for a portion of its length to engage corresponding screw-threads on the interior of the screw 22 and is adapted to be rotated by means of its slotted head 26, set in the outer wall of the rim flush with the surface thereof.

Screws 27 are removably set in the inner face of the weight 20 and may be replaced by heavier or lighter screws whenever it is desired to vary the mass of the weight 20. This feature furnishes an additional adjustment of the wheel, its principal advantage being to enable the proper adjustment of the wheel for accurate compensation where the temperature conditions are such as to render the ordinary compensating means insufficient to accomplish perfect compensation.

It will be apparent that the compensation adjustment in reality comprises three adjustments, viz., the radial movement of weight elements 20, 21 and 22 through turning of screw-rod 24; the independent radial movement of weight-screw 22 in or out of the tubular weight-portion 21; and the replacement of the weight-screws 27.

To insure the satisfactory compensatory operation of the device, the screw-rod 24 should be composed of a metal or alloy having a coefficient of expansion at least twice as great as the coefficient of expansion of the metal or alloy of which the other parts of the compensating device are composed. By way of illustration, in explaining the operation of the invention, it will be assumed that the disk and its attached rim 1 are of platinum and that the weight elements 20, 21, 22 and 27 are of the same metal, while the rod 24 is of silver, which has a coefficient of expansion approximately three times as great as platinum. When the parts are properly adjusted for a certain temperature, a rise in temperature will then cause the disk and rim to expand, moving the rim farther away from the hub and tending to carry with it the weight elements resting on its surface. Simultaneously the weight elements, being of the same metal as the disk and rim, will tend to move independently an equal distance away from the hub, by sliding along the disk toward the rim. The sum of these two expansions, which is twice the unit of expansion of platinum, represents the extent of outward travel of the weight elements if unimpeded. But while this is taking place, the silver rod 24 is expanding three times as much as the platinum parts, and, being prevented from moving longitudinally in the direction of the rim by the washer 28 which is fixed to the rod 24 and abuts the inner side of the rim, the longitudinal expansion is naturally in the opposite direction, that is to say, inwardly. Sufficient clearance is provided between the end of the rod and the inner wall of the socket 25 to permit such longitudinal travel of rod 24. The inward expansion of rod 24 carries with it the connected parts 22, 21 and 20, the weight elements 21 and 20 being fixed to the rod through the screw-threaded connection between screw 22 and both the tubular weight portion 21 and the rod 24. Thus, under compulsion of the expanding silver rod, the tendency of the weight elements to move outwardly two units is overcome and these parts are actually moved inwardly one unit. This amount of inward movement exactly compensates the outward movement of the rim one unit and the original balance is maintained. If the expansion of the silver rod falls short of being sufficient to counteract the outward expansion of the rim, a further adjustment may be made by turning screw 22 toward the hub, thus lengthening the active part of the compensating weight and increasing the amount of its longitudinal expansion. In this way any slight discrepancy in the resulting action of the unequal expansion of the two different metals may be obviated or corrected. This can also be done by changing screws 27, as heretofore described.

It will also be apparent that the weight 9 of the timing device, being of gold, which has twice the coefficient of expansion of platinum, will not be carried outward by the outward expansion of the platinum rim and disk, but will retain its same relative position with respect to the other parts.

I claim:

1. A balance wheel comprising a hub, a rim, and a solid disk connecting said rim to said hub.

2. A balance wheel comprising a hub, a rim, a solid disk connecting the rim to the hub, and a cover attached to the wheel.

3. A balance wheel comprising a hub, a rim, a solid disk connecting the rim to the hub, and a cover on the wheel resting upon the free edge of the rim.

4. A balance wheel comprising a hub, a rim, a member connecting the rim to the hub, and a cover on the wheel.

5. A balance wheel comprising a hub, a rim, a member connecting the hub and rim, a cover on the wheel, and timing and compensating devices positioned within the rim and adjustable from without the rim.

6. In a balance wheel, a hub, a rim, a member connecting the hub and rim, compensating devices positioned within the rim, means for performing ordinary adjustments of said devices from without the rim, and additional means within the wheel for further adjusting said devices.

7. In a balance wheel, a hub, a rim, a member connecting the rim to the hub, compensating devices positioned within the circumference of the rim and adjustable from without the rim, and timing devices also positioned within the circumference of the rim and adjustable from without the rim.

8. In a balance wheel, a hub, a rim, a member rigidly connecting the rim to the hub, and a compensating device positioned within the rim, said compensating device comprising a radially disposed rod of relatively high coefficient of expansion fixed at one end and free to move longitudinally at the other end, and a weight having a relatively low coefficient of expansion slidably resting on the member which connects the hub and rim and fixed at one end to said radially-disposed rod.

9. In a balance wheel, a hub, a rim, a member connecting said rim to said hub, timing devices positioned within the rim, and compensating devices positioned within the rim, said timing devices and compensating devices being arranged in alternating relation around the wheel.

10. In a balance wheel, a compensating device comprising an outwardly expansive element of a low coefficient of expansion and an inwardly expansive element of a relatively high coefficient of expansion.

11. In a balance wheel, a compensating device comprising an outwardly expansive element of a relatively low coefficient of expansion and an inwardly expansive element of a relatively high coefficient of expansion, said outwardly expansive element being slidably mounted on said inwardly expansive element and having one end fixedly connected thereto.

12. In a balance wheel, a compensating device, comprising a compensating weight element of a low coefficient of expansion slidably positioned on said wheel within the rim thereof and free to expand longitudinally in an outward direction, said weight element being connected to a second expansive member of a relatively high coefficient of expansion which is free to expand only in an inward direction.

13. In a balance wheel, a compensating device comprising a plurality of compensating members having different coefficients of expansion and so constructed and arranged as to be expansible in opposite directions.

14. In a balance wheel, a compensating device comprising a plurality of compensating members within the rim of the wheel and adjustable from without the rim, said compensating members being so constructed and arranged that each is capable of expansion in a direction different from the expansive direction of any other of said members.

15. In a balance wheel, a compensating device comprising an outwardly expansive compensating weight of a relatively low coefficient of expansion, an inwardly expansive member of a relatively high coefficient of expansion, said outwardly expansive member being slidably mounted on said inwardly expansive member and having one end fixedly connected thereto, and means for adjusting the length of the active part of the said compensating weight.

16. In a balance wheel, a hub, a rim, a member connecting the hub and rim, a radially disposed rod fixed at one end to the rim and so engaging the hub at its other end as to permit of inward radial expansion, a compensating weight member slidably supported upon the member which connects the rim and hub, said compensating weight member being mounted upon the radial rod with its inner end secured thereto, whereby the radial rod is adapted to expand only in an inward radial direction and the compensating weight member is adapted to expand only in an outward radial direction.

17. In a balance wheel, a hub, a rim, a member connecting the rim and hub, a compensating device positioned within the rim, said compensating device comprising a radially disposed rod of relatively high coefficient of expansion fixed at one end and free to expand radially at the other end, a compensating weight of relatively low coefficient of expansion slidably resting upon the member which connects the rim and hub and fixed at one end to the radially disposed rod, means for adjusting the length of the compensating weight, and means for varying the weight of said weight.

18. In a balance wheel, a hub, a rim, a member connecting the rim and hub, a compensating device positioned within the rim, said compensating device comprising a radially disposed rod of relatively high coefficient of expansion fixed at one end and free to expand radially at the other end, a compensating weight of relatively low coefficient of expansion having a segmental portion and a rod portion, means on the segmental portion for varying the weight of the compensating weight, and means on the rod portion for varying the length of the active part of the compensating weight, the compensating weight being fixed at one end to the radially disposed rod and free to expand radially at its other end.

19. In a balance wheel, a compensating device comprising a member expansible relative to said wheel only in an inward radial direction, and a second member expansible only in an outward radial direction.

INGILD POVELSEN.